United States Patent [19]

Johnston

[11] Patent Number: 4,923,074
[45] Date of Patent: May 8, 1990

[54] TAILGATE AND TAILGATE SEAL

[75] Inventor: William T. Johnston, Alliance, Ohio

[73] Assignee: Trailstar Manufacturing, Alliance, Ohio

[21] Appl. No.: 263,827

[22] Filed: Oct. 28, 1988

[51] Int. Cl.⁵ ................................. E06B 7/22
[52] U.S. Cl. ...................................... 220/1.5; 220/232
[58] Field of Search .............. 220/232, 239, 240, 225, 220/1.5; 49/477

[56] References Cited

U.S. PATENT DOCUMENTS

| | | | |
|---|---|---|---|
| 2,330,220 | 9/1940 | Kemper | 220/239 |
| 2,843,422 | 7/1958 | Black . | |
| 3,042,980 | 7/1962 | Brinsmade . | |
| 3,178,779 | 4/1965 | Clark | 49/477 |
| 3,266,657 | 8/1966 | Stachiw | 220/239 |
| 3,284,955 | 11/1966 | Schroth . | |
| 3,311,042 | 3/1967 | Severson . | |
| 3,424,222 | 1/1969 | Stoner et al. . | |
| 3,694,962 | 10/1972 | McDonald | 49/477 |
| 3,745,707 | 7/1973 | Herr . | |
| 3,747,275 | 7/1973 | May et al. . | |
| 3,849,092 | 11/1974 | Bakke | 49/477 |
| 4,114,901 | 9/1978 | Pot | 220/232 |
| 4,366,977 | 1/1983 | Davis et al. . | |
| 4,665,653 | 5/1987 | Franz | 220/232 |

Primary Examiner—Steven M. Pollard
Attorney, Agent, or Firm—Fay, Sharpe, Beall, Fagan, Minnich & McKee

[57] ABSTRACT

A box-like sealable container for transporting and discharging material includes an improved tailgate and tailgate seal. The container has walls which define an opening, and the tailgate attached thereto has a periphery that overlies the opening. The tailgate seal is an elongated tubular member mounted inside a metal channel fastened on an outer wall of the container about the opening. When pressurized, the tubular member expands out of the channel and sealingly engages the tailgate if the tailgate is in a closed first position. Reinforcement members mounted on an outer wall of the tailgate prevent tailgate distortion.

16 Claims, 3 Drawing Sheets

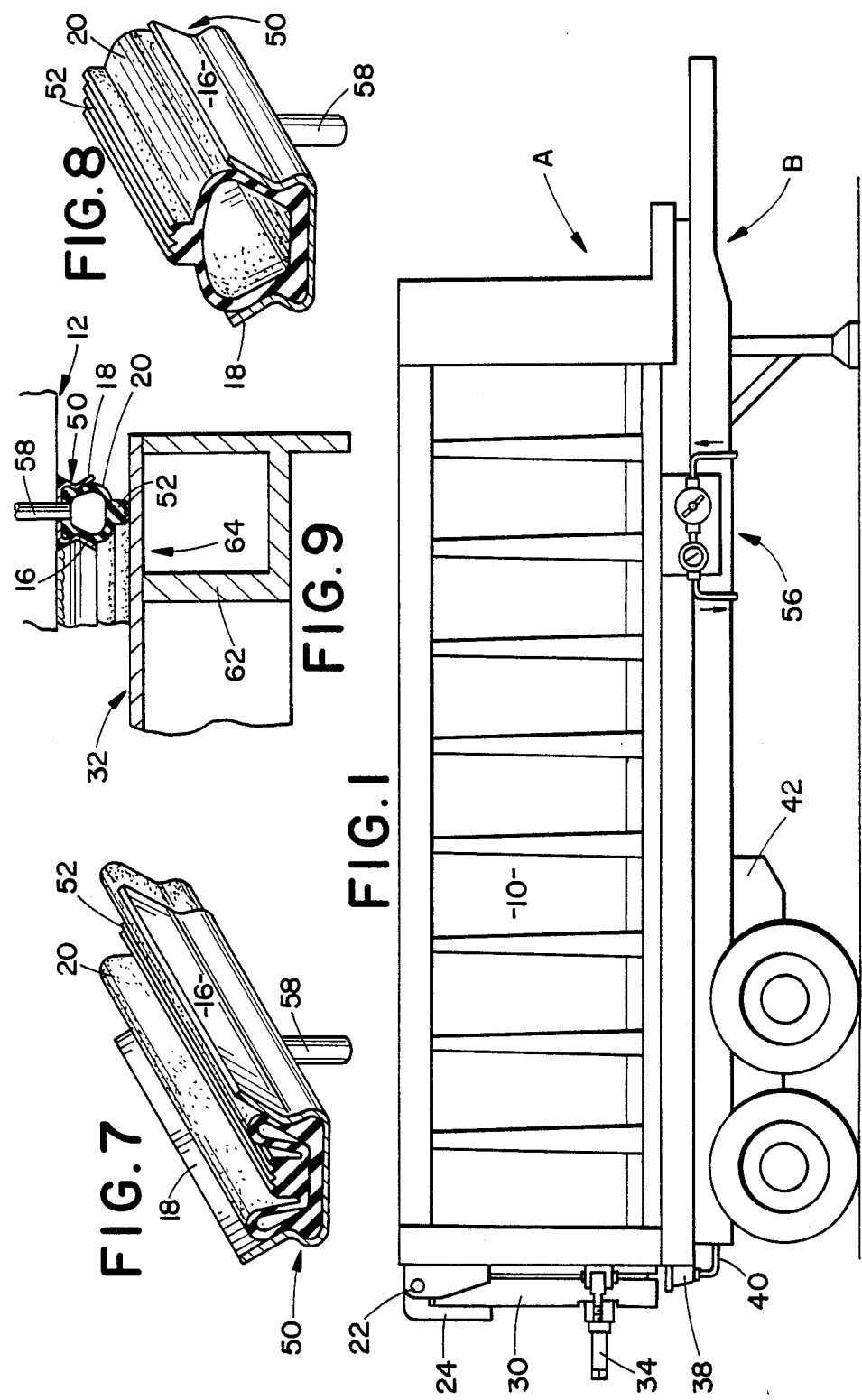

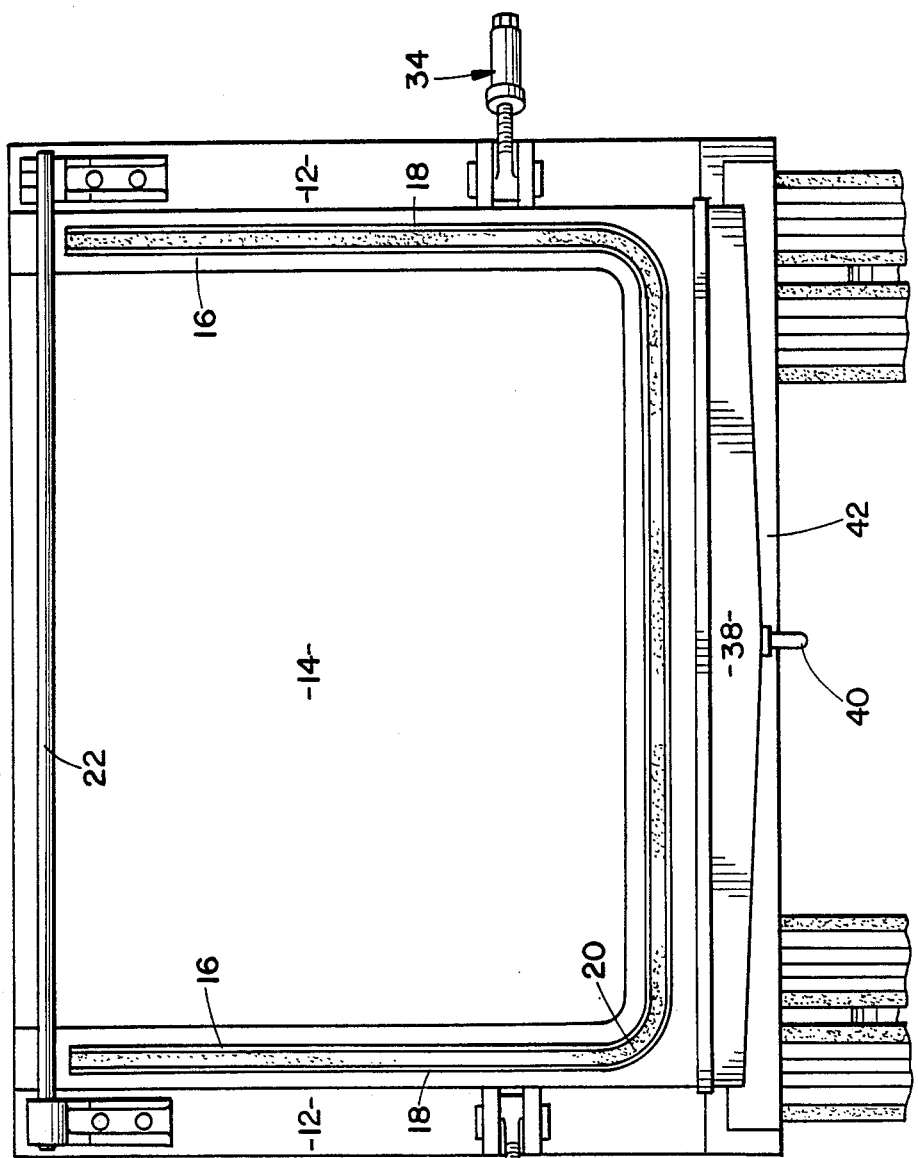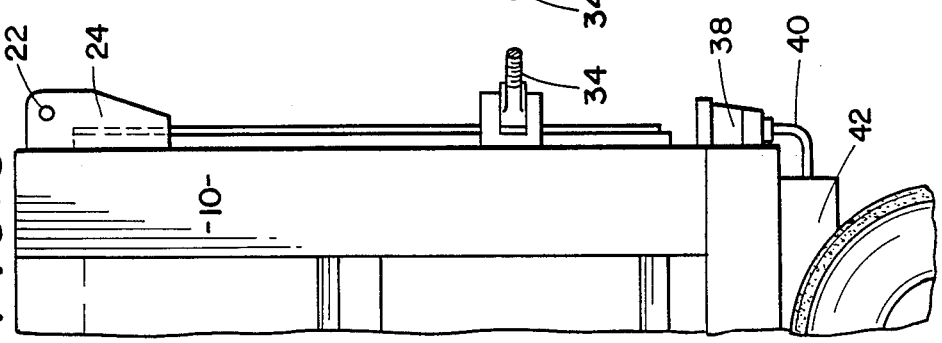

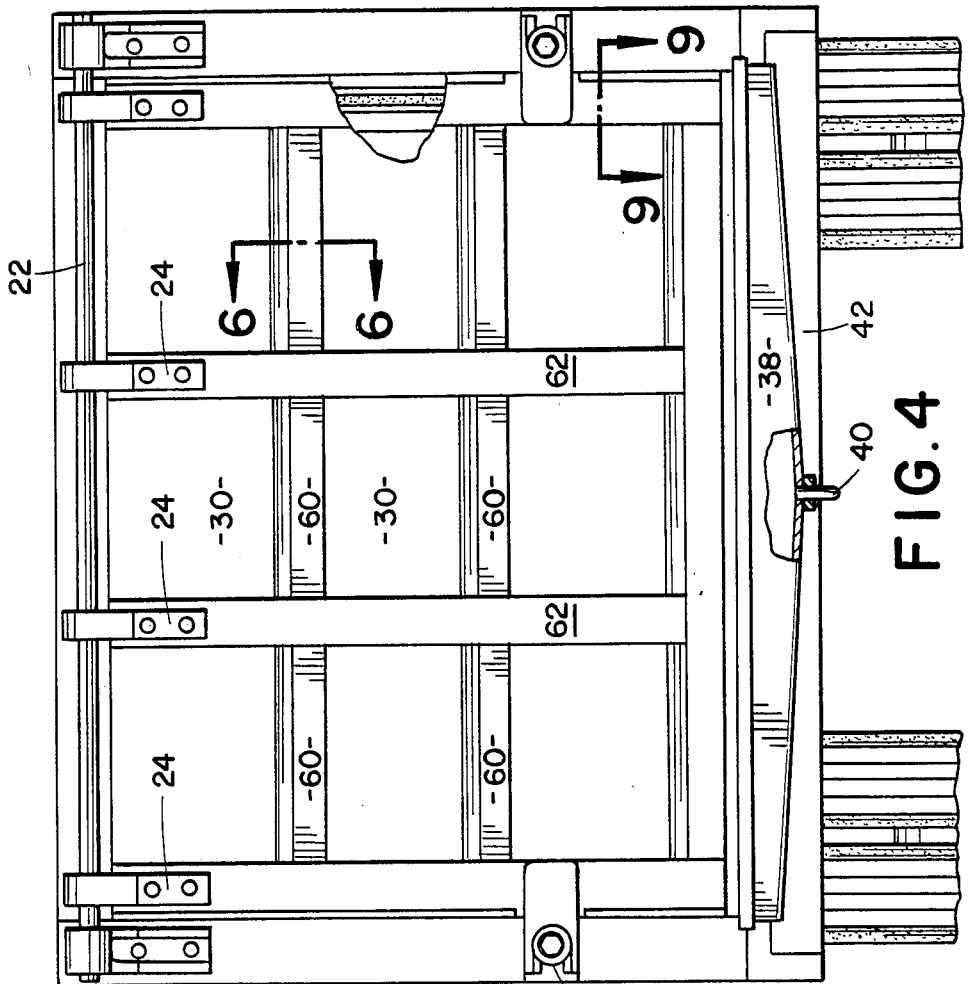

TAILGATE AND TAILGATE SEAL

BACKGROUND OF THE INVENTION

This invention pertains to the art of tailgates and more particularly to sealable tailgates.

This invention is particularly applicable to sealable tailgates of large containers of the type used for transporting hazardous waste, such as dump trailers, and will be described with particular reference thereto. However, it will be appreciated that the invention has broader application and may be advantageously employed in other environments.

Tailgates of the type to which this invention pertains are typically components of large containers and trailers used for transporting waste materials, specifically hazardous waste materials. The nature of these materials, necessitates that the tailgates be capable of being properly sealed. However, previous attempts to seal these tailgates have proven somewhat ineffective.

In the past, the typical tailgate was sealed by affixing rubber strips around the frame of the tailgate opening. When the tailgate was closed, the rubber was expected to provide a sufficient seal for the container and prevent materials from seeping out. However, the simple rubber seal proved to be ineffective for a variety of reasons. It was normally positioned in such a way that it was continually exposed about the frame when the tailgate was open. Material that was discharged through the opening flowed directly over the rubber and eventually caused portions of the rubber to be worn away. This wearing away diminished the seal's effectiveness, and substantial leaks developed around the tailgate. Notably, however, the wearing away of the rubber was not the only factor which caused the tailgate to leak.

As the loaded containers were transported by trucks along the highways, the materials inside, typically either fluids or slurries, were forced against the tailgate. In time, the tailgate became distorted and bowed outwardly. This distortion forced the periphery of the tailgate to lose its snug fit over the rubber seal. In effect, the worn rubber seal, coupled with the distorted tailgate, dangerously allowed transported materials, even hazardous waste materials, to leak from the tailgate. Both the rubber seal and the tailgate had to be replaced continually. Although these constant replacements provided a temporary solution to the leakage problem, they did not prove economically feasible Instead, the entire situation presented substantial difficulties with respect to safe and economical transportation of hazardous wastes to designated waste depositories. In order to overcome these difficulties, it became desirable to develop an economical tailgates seal that does not rapidly wear out and that does not require continuous replacement. Further, it became desirable to develop a tailgate that is restrained from being distorted about its periphery.

The present invention contemplates a new and improved arrangement which overcomes all of the above-described problems and others to provide a tailgate assembly wherein a seal is situated and arranged so that it will not be worn out by the passage of material through the tailgate opening. Because this seal is in a protected position, it does not have to be continually replaced, and provides an economical means for sealing the tailgate. Additionally, the present invention discloses a peripherally reinforced tailgate which will prevent distortion and reduce the likelihood that hazardous materials will leak from the container.

BRIEF DESCRIPTION OF THE INVENTION

In accordance with the present invention there is provided an improved tailgate and seal assembly for a waste container or vehicle. The tailgate seal is an elongated, expansible tubular member that is mounted inside a metal channel. The channel is fastened to the outer wall of the container about the tailgate opening. The tubular member is arranged to readily expand outwardly in response to fluid pressure supplied to its interior. Preferably, the pressure is supplied from the air-braking system of the truck that hauls the container. Because it is driven outwardly of the channel when pressurized, the tubular member sealingly engages the tailgate door and prevents material from leaking out of the container.

In accordance with a more limited aspect of the invention, a box-like sealable container for transporting and discharging material is provided. The container comprises a plurality of walls that define a chamber wherein material is stored during its transport. The walls have inner and outer surfaces and define an opening through which the material is eventually discharged. The container also has a door that has a peripheral extent that is greater than the extent of the opening. A mounting means supports the door so that it can move from a closed first position that overlies the opening, to an open second position that is spaced from the opening. In addition, a closure means selectively maintains the door in the first closed position. A sealing gasket assembly for sealing between the peripheral portion of the door and the outer surface of one wall of the plurality of walls includes a first rigid flange member that extends outwardly of the outer surface of the wall about the opening, and a resilient sealing gasket that is closely adjacent the first rigid flange on the side that is laterally opposite the opening. The first rigid flange prevents material from contacting and eventually wearing away the sealing gasket when material is discharged through the opening. The first rigid flange member causes this material to flow away from the gasket member. Furthermore, the door includes a reinforcement means along its periphery that causes the door to maintain a predetermined configuration whereby the sealing gasket maintains a tight seal when the door is in the closed position.

As is apparent, a primary advantage of the invention is that the improved tailgate seal assembly will not become worn as a result of continually contacting material as it is discharged from the container.

Another advantage of the invention is that reinforcement members along the periphery of the door prevent the door from being physically disfigured or distorted in such a way so as to keep the door from properly maintaining a tight seal around the tailgate.

Still other advantages and benefits of the invention will become apparent to those skilled in the art upon a reading and understanding of the following detailed description.

BRIEF DESCRIPTION OF THE DRAWINGS

The invention may take form in certain parts and arrangements of parts, a preferred embodiment of which will be described in detail in this specification and illustrated in the accompanying drawings which form a part hereof and wherein:

FIG. 1 is an elevational view of the rear wall of the having an improved tailgate sealing mechanism of the present invention installed thereon;

FIG. 2. is an elevational view of the rear wall of the container wherein the door is removed to show the tailgate sealing mechanism as it is affixed thereon;

FIG. 3 is a partial elevational view of the rear portion of a side of the container with the door removed;

FIG. 4 is an elevational view of the rear of the container with the door in a closed position (portions are broken away to show details of the door construction);

FIG. 5 is a partial elevational view of the rear portion of a side of the container with the door in closed position;

FIG. 6 is a cross-sectional view taken along line 6—6 of FIG. 4;

FIG. 7 is a perspective view of a portion of a tailgate seal assembly wherein a gasket is in a deflated position inside a metal channel;

FIG. 8 is a perspective view of a portion of a tailgate seal assembly with the gasket in an inflated position such that a portion of the seal extends out of the metal channel; and, FIG. 9 is a cross-sectional view taken along line 9—9 of FIG. 4.

DETAILED DESCRIPTION OF THE PREFERRED EMBODIMENT

Referring now to the drawings wherein the showings are for purposes of illustrating the preferred embodiments of the invention and not for purposes of limiting same, FIG. 1 shows generally a large container A mounted on top of a hauling frame or vehicle B. Container A is often temporarily situated at a site at which waste materials, oftentimes hazardous waste materials, are produced. The container A is left at the site, separated from hauling frame B, for a duration during which the waste materials are gradually loaded into container A. When container A is sufficiently filled, it is moved onto the hauling frame B. As the material is transported to a designated hazardous waste depository, the container is maintained tightly sealed in an effort to prevent the materials therein from leaking out.

In the subject embodiment, container A is defined by a plurality of walls 10 having inner and outer surfaces, with a rear wall 12 illustrated in FIG. 2. The rear wall 12 is shown as defining an opening 14 which encompasses a major portion of the rear wall 12 of container A. A first flange member 16 extends outwardly generally perpendicular from the rear wall, around and closely adjacent the opening 14. A second flange member 18 extends in spaced, parallel relation with the first flange member 16, and a resilient tubular member or sealing gasket 20 is received between the first and second flange members 16 and 18. Preferably the flanges are produced by an extrusion of an aluminum channel 50. The first flange member is significant for the purposes of this invention in that it protects gasket 20 from making substantial contact with the hazardous waste materials as they are discharged through the opening 14. By minimizing the contact of the hazardous waste materials with the gasket 20, the gasket is not rapidly worn away and is thereby able to provide a tight effective seal when a door 30, as shown in FIG. 4, is in contact therewith. This door 30 has a peripheral extent greater than that of opening 14 and has an outer peripheral surface portion which overlies the gasket 20.

Still referring to FIG. 2, and referring to FIGS. 3 through 5 as well, according to the preferred embodiment a door mounting means comprising a rod 22 and hinge members 24 is shown outside the container near the top portion of rear wall 12 and at the top of opening 14. With the mounting means positioned near the top of the door 30, the door can swing outwardly from a closed first position, as shown, to an open second position as the container A is inclined rearwardly.

Closure means 34 are provided adjacent the opening 14. These closure means 34 serve to selectively maintain the door 30 in its closed first position as shown in FIG. 4. After the door 30 is closed, the closure means 34 are manually shifted from their unlocked position as shown in FIGS. 2 and 3, to their locked position as shown in FIGS. 4 and 5. When they are in locked position, the closure means 34 hold the door 30 in closed first position. When they are in unlocked position, closure means 34 are removed from the door 30 as provided in FIGS. 2 and 3, and the door 30 can swing freely to open second position when the container is inclined.

An auxiliary leak collecting means shown in the form of gutter 38 adjoins the door 30. While the container is being transported to a designated hazardous waste site, the gutter 38 provides a means for collecting any waste material which may leak or seep between the door 30 and rear wall 12. A drainage collecting means or conduit 40 joins the gutter 38 with a secondary storage tank 42 that is located beneath the hauling platform B. Leakage from the container A passes to the gutter 38 and can safely make its way through the conduit 40 and into the tank 42. Material being transported will neither create a safety hazard nor a road hazard because it will be self-contained inside container A, and any leaks which may occur will be self-contained as well.

Turning to FIGS. 7 and 8, and with continuing reference to FIG. 2, the first and second flange member 16 and 18 are defined by a metal channel 50. The metal channel 50 can be affixed onto the rear wall 12 in any suitable manner such as by an adhesive or welding. It is important that the flange be joined in a manner to prevent leakage between the channel and the wall. FIG. 7 shows the gasket 20 deflected inside the channel in a deflated state. When it is deflated, the gasket 20 is not in sealing position. Rather, it is deflected inward to a protected position between the flanges 16 and 18. FIG. 8, on the other hand, shows the gasket 20 inflated to sealing position. A sealing bead 52 protrudes outwardly from between the flanges 16 and 18 and is the portion of the gasket 20 which sealingly engages an opposing wall which, in accordance with the present invention, is an inner wall 32 of the door 30. FIG. 9 shows the inflated gasket 20 sealingly engaging an inner wall 32 of the door 30.

The sealing gasket 20 is inflated and expands generally outwardly in response to fluid pressure. Many different systems, either hydraulic or pneumatic, could be used to pressurize the sealing gasket 20. In the subject embodiment, however, pressurized air is provided by the air brake system of the truck which hauls the container. FIG. 1 shows an air regulator and control 56 along the side of the hauling platform B. The regulator 56 supplies air from the truck's air storage cylinder through a fluid inlet means 58 and into the sealing gasket 20 to inflate the gasket to sealing position, and releases the air pressure from the gasket 20 to place the gasket in its unsealed, deflated position of FIG. 7.

Reinforcement members 60 and 62 are affixed horizontally and vertically along portions of the door 30, namely along a perimeter of the door and intermittently along an outer face or wall 64 thereof. These reinforcement members prevent the door 30 from distorting and bowing outwardly when the materials that are inside the container A are forced against the door 30 during transport. By preventing the door 30 from undergoing distortion, the seal provided by the gasket will not be broken by an uneven inner door wall 32, and a more effective seal will thus be provided.

The horizontal reinforcement members 60 are more clearly depicted in FIG. 6. One of the vertical reinforcement members 62 is shown in FIG. 9. In both FIGS. 6 and 9, the reinforcement members are shown abutting against the outer wall 64 of door 30. When the materials inside the container generate forces against inner wall 32 of rear door 30 during transport, the reinforcement members 60 and 62 prevent the door from distorting or bowing outwardly. Since the door 30 is prevented from distorting, the inner wall 32 will remain planar and the seal between the inner wall 32 and gasket 20 will remain tight when the door 30 is in closed position and the gasket 20 is pressurized. FIGS. 6 and 9 show an activated seal. More specifically, the bead 52 protruding from the inflated gasket 20 is shown sealingly engaging the inner wall 32 of door 30 when the door 30 is in closed first position. When the gasket 20 is pressurized so that the bead engages the inner wall 32 of the door 30, the container A is sealed so that the materials contained therein will not leak out. The reinforcement means 60 and 62 cause the door 30 to maintain a configuration whereby the sealing gasket 20 maintains a tight seal when the door 30 is in closed first position and the gasket 20 is pressurized. In the unlikely event that the materials do leak, a gutter 38 collects such leakage and the conduit 40 connected thereto will take it to a tank that is located beneath the hauling platform.

The invention has been described with reference to the preferred embodiments. Obviously, modification and alterations will occur to others upon a reading and understanding of this specification. It is intended to include all such modifications and alterations insofar as they come within the scope of the appended claims or the equivalents thereof.

What is claimed is:

1. A box-like sealable container for transporting and discharging material, said container comprising:
   a plurality of walls defining a chamber wherein said material is stored during transport, said walls having an inner surface and an outer surface and defining an opening in a rear wall of said plurality of walls through which said material is discharged;
   a door having a peripheral extent greater than said opening;
   mounting means supporting said door for swinging movement from a closed first position located exteriorly of said chamber and overlying said opening to an open second position spaced from said opening;
   closure means for selectively maintaining said door in said first position; and,
   a sealing gasket assembly for sealing between the peripheral portion of said door and the outer surface of said rear wall, said gasket assembly including a resilient sealing gasket facing outwardly from the rear wall about said opening, and a first rigid flange member extending outwardly of the outer surface of said rear wall about said opening beyond a major portion of said resilient sealing gasket, said resilient sealing gasket situated closely adjacent said first rigid flange on the side laterally opposite said opening, whereby said first rigid flange serves to shield said resilient sealing gasket from contact with material discharging from said container.

2. The container of claim 1 wherein a second rigid flange is in general parallel relation with said first rigid flange, said sealing gasket longitudinally received between said first and second flanges.

3. The container of claim 2 wherein said sealing gasket is an elastomeric tubing means which expands generally outwardly in response to fluid pressure, wherein said tubing includes an outwardly projecting bead which extends beyond said first and second flanges to an engaging relationship with said door.

4. The container of claim 3 wherein said bead is deflected inward of said flanges upon depressurizing said tubing means.

5. The container of claim 4 wherein said first flange is sized to prevent material that is discharged through said opening from substantially contacting said depressurized tubing means.

6. The container of claim 2 wherein said first and second rigid flanges are connected by an elongated plane running along the entire length of said flanges whereby said flanges and said elongated plane combine to form a channel.

7. The container of claim 6 wherein said elongated plane of said channel is received on said wall about said opening whereby said first and second flanges extend outwardly from said wall.

8. The container of claim 1 wherein said mounting means includes a hinge means which allows said door to swing outwardly to said open second position.

9. The container of claim 1 wherein said door includes reinforcement means along its periphery, said reinforcement means causing said door to maintain a configuration whereby said sealing gasket maintains a tight seal when said door is in said closed first position and said tubing member is pressurized.

10. The container of claim 1 wherein an auxiliary leak collecting means adjoins said door and includes a drainage collecting means in association with a secondary storage tank.

11. A box-like sealable container for transporting and discharging material, said container comprising:
    a plurality of walls defining a chamber wherein said material is stored during transport, said walls having an inner surface and an outer surface and defining an opening in a rear wall of said plurality of walls through which said material is discharged;
    a door having a peripheral extent greater than said opening;
    mounting means supporting said door for swinging movement from a closed first position located exteriorly of said chamber and overlying said opening to an open second position spaced from said opening;
    closure means for selectively maintaining said door in said first position; and,
    a sealing gasket assembly for sealing between the peripheral portion of said door and the outer surface of said rear wall, said gasket assembly including a first rigid flange member extending outwardly of the outer surface of said wall about said opening, a second rigid flange member extending in general parallel relation with said first rigid flange member, and an outwardly facing resilient sealing gasket received between said first and second flanges, the first rigid flange extending outwardly beyond the sealing gasket when said gasket is in a depressurized state.

12. The container of claim 11 wherein said sealing gasket is an elastomeric tubing means which expands generally outwardly in response to fluid pressure, wherein said tubing includes an outwardly projecting bead which extends beyond said first and second flanges to an engaging relationship with said door, and door being in said closed first position, and said tubing means being subjected to fluid pressure.

13. The container of claim 12 wherein said bead is deflected inward of said flanges upon depressurizing said tubing means.

14. The container of claim 13 wherein said first flange prevents material that is discharged through said opening from substantially contacting said depressurized tubing means.

15. The container of claim 11 wherein said door includes reinforcement means along its periphery for causing said door to maintain its configuration whereby said sealing gasket maintains a seal when said door is in said closed first position and said tubing member is pressurized.

16. The container of claim 11 wherein an auxiliary leak collecting means adjoins said door and includes a drainage collecting means in association with a storage tank.

* * * * *